United States Patent [19]

Hensley, Jr. et al.

[11] 4,434,047

[45] Feb. 28, 1984

[54] CATALYTIC DEWAXING-HYDROTREATING PROCESS

[75] Inventors: Albert L. Hensley, Jr., Munster; Thomas D. Nevitt; A. Martin Tait, both of Naperville, all of Ind.

[73] Assignee: Standard Oil Company (Indiana), Chicago, Ill.

[21] Appl. No.: 320,862

[22] Filed: Nov. 13, 1981

[51] Int. Cl.³ .................. C10G 47/16; C10G 47/20
[52] U.S. Cl. ............................. 208/111; 208/109; 208/110; 208/112; 502/60
[58] Field of Search ..................................... 208/111

[56] References Cited

U.S. PATENT DOCUMENTS

| | | | |
|---|---|---|---|
| 2,983,670 | 5/1961 | Seubold | 208/111 |
| 3,328,119 | 6/1967 | Robson | 252/432 |
| 3,700,585 | 10/1972 | Chen et al. | 208/111 |
| 3,929,620 | 12/1975 | Parthasarathy et al. | 208/111 |
| 4,269,813 | 5/1981 | Klotz | 252/432 |
| 4,306,965 | 12/1981 | Hensley et al. | 208/111 |

Primary Examiner—Delbert E. Gantz
Assistant Examiner—Anthony McFarlane
Attorney, Agent, or Firm—James R. Henes; William T. McClain; William H. Magidson

[57] ABSTRACT

Process for catalytic dewaxing-hydrotreating of hydrocarbon feed materials comprising contacting the feed with hydrogen under catalytic dewaxing-hydrotreating conditions in the presence of a catalyst comprising a shape selective zeolitic cracking component and a hydrogenating component of improved thermal stability comprising a chromium component, at least one other Group VIB metal component and at least one Group VIII metal component. According to a specific aspect of the invention, the catalytic dewaxing-hydrotreating process is employed to convert hydrocarbon feeds of either high or low quality to lube oil base stocks of high viscosity index, low pour point and good stability in a single step.

18 Claims, No Drawings

CATALYTIC DEWAXING-HYDROTREATING PROCESS

BACKGROUND OF THE INVENTION

This invention relates to catalytic dewaxing and hydrogenation of hydrocarbon feed materials using a catalyst of improved high temperature stability. In a specific aspect, the invention relates to a single step catalytic dewaxing and hydrotreating process for production of lube oil base stocks from a wide range of feeds including relatively low quality, contaminant-containing, waxy hydrocarbon feeds.

Catalytic dewaxing of petroleum and synthetic crude oil fractions in the presence of shape selective catalysts capable of selectively cracking n-paraffins and isoparaffins is well known. For example, U.S. Pat. No. Re. 28,398 (Chen et al.), which is a reissue of U.S. Pat. No. 3,700,585, discloses the use of shape selective crystalline aluminosilicate zeolite ZSM-5 in catalytic dewaxing processes directed at removing high freezing point paraffins from jet fuel to lower the freezing point, improving the octane rating of naphtha fractions and lowering the pour point of lube oil base stocks. According to Chen et al. the shape selective cracking ability of crystalline aluminosilicate ZSM-5 permits selective cracking of n-paraffins and certain isoparaffins without substantial cracking of desirable feed components such that improved catalytic dewaxing products are obtained under both hydrotreating and hydrocracking conditions. Chen et al. also discloses the use of crystalline aluminosilicate zeolite ZSM-5 associated with hydrogenating metals such as tungsten, vanadium, molybdenum, rhenium, nickel, cobalt, chromium, manganese, platinum or palladium, such metals being associated with the zeolite by exchange or impregnation.

An abstract of U.S. Pat. No. Re 30,529, which is a reissue of U.S. Pat. No. 4,100,056, discloses catalytic dewaxing of atmospheric and vacuum distillates in the presence of a catalyst containing mordenite in hydrogen form and a Group VI or VIII metal to obtain naphthenic lube oils of intermediate viscosity index and pour points ranging from $-50°$ to $+20°$ F.

An abstract of U.S. Pat. No. 4,222,855 discloses catalytic dewaxing of 450°–1,050° F. hydrocarbon fractions to produce high viscosity index lube oils employing a catalyst containing crystalline aluminosilicate zeolite ZSM-23 or ZSM-35, preferably in hydrogen form and associated with platinum, palladium or zinc. According to the abstract, the use of catalysts containing crystalline aluminosilicate zeolite ZSM-23 or ZSM-35 gives products of higher viscosity index and lower pour point than products obtained through the use of crystalline aluminosilicate zeolite ZSM-5.

U.S. Pat. No. 4,247,388 (Banta et al.) is directed to improving crystalline aluminosilicate zeolites such as ZSM-5 in terms of dewaxing performance by treatment to adjust alpha activity. According to the patentee, alpha activity is adjusted by partial replacement of cationic sites of the crystalline aluminosilicate zeolite with basic cations such as sodium, by partial coking of the zeolite, by employing the zeolite in combination with an inert matrix material, by manipulating the silica to alumina ratio of the zeolite, or preferably, by steaming. Crystalline aluminosilicate zeolites adjusted in terms of alpha activity can be employed in association with exchanged or impregnated hydrogenating metals such as tungsten, vanadium, molybdenum, rhenium, nickel, cobalt, chromium, manganese, platinum or palladium. A disclosure similar to that of Banta et al. is found in an abstract of British Pat. No. 2,027,742.

U.S. Pat. No. 4,251,348 and U.S. Pat. No. 4,282,085 (both O'Rear) are directed to processes similar to those described hereinabove wherein a low nitrogen content petroleum distillate fraction boiling from 180°–1,200° F. is contacted with crystalline aluminosilicate zeolite ZSM-5 or a similar crystalline aluminosilicate zeolite in a form substantially lacking in hydrogenation activity to form an effluent which then is fractionated into an upgraded product stream and a $C_3$–$C_4$ olefin fraction. If desired, the crystalline aluminosilicate zeolite can be dispersed in a porous matrix having only insubstantial cracking activity. Suitable matrix materials include pumice, firebrick, diatomaceous earth, alumina, silica, zirconia, titania, amorphous silica-alumina mixtures, bentonite, kaolin, silica-magnesia, silica-zirconia or silica-titania. A similar disclosure is found in an abstract of Belgium Pat. No. 877,772.

U.S. Pat. No. 4,259,174 (Chen et al.) discloses catalytic dewaxing of hydrocarbon feeds to reduce pour point and produce high viscosity index distillate lube oil stocks in the presence of a synthetic offretite crystalline aluminosilicate zeolite catalyst which may contain exchanged or impregnated hydrogenating metals such as tungsten, vanadium, molybdenum, rhenium, nickel, cobalt, chromium, manganese, platinum or palladium. The crystalline aluminosilicate zeolite may be dispersed within a matrix of alumina, silica, silica-alumina, etc. Column 5 line 67-Column 6 line 17. It is unclear whether the patentee contemplates use of the crystalline aluminosilicate zeolite in association with both hydrogenating metals and matrix materials.

An abstract of British Pat. No. 2,055,120 (Mobil) discloses a method for reclaiming or upgrading contaminated, dewaxed lube oil base stocks having a tendency to form a waxy haze during storage, comprising contacting the oil with hydrogen at 500°–675° F. and space velocity of 2–10 in the presence of a crystalline aluminosilicate zeolite having a silica to alumina ratio of at least 12 and a constraint index of 1–12.

In preparation of lube oils from hydrocarbon feeds, catalytic dewaxing processes such as described hereinabove often are combined with hydrotreating, hydrocracking and/or various solvent extraction steps to obtain products having desired properties. Typically, hydrocracking and/or solvent extraction steps are conducted prior to catalytic dewaxing to remove components such as metal-containing feed components, asphaltenes and polycyclic aromatics having properties that differ grossly from those desired. In particular, solvent extraction is conducted to remove polycyclic aromatic feed components and nitrogen-containing cyclic components, removal of the latter being particularly important in order to avoid poisoning of catalyst in catalytic dewaxing. Hydrotreating under mild or severe conditions typically follows catalytic dewaxing operations and serves to improve such lube oil properties as stability and viscosity index.

As one example of a process for producing lube oils in which a catalytic dewaxing step is included as part of a multistep process, U.S. Pat. No. 4,259,170 (Graham et al.) discloses a process that includes a combination of catalytic dewaxing and solvent dewaxing steps. According to a more specific aspect of Graham et al., the process includes a solvent extraction step prior to the dewaxing steps. As a further example of a multistep process for preparation of lube oils, Chen et al. '174, discussed hereinabove, discloses a process comprising solvent extraction followed by catalytic dewaxing. Finally, U.S. Pat. No. 4,283,272 (Garwood et al.) discloses preparation of lube oils by a process that includes hydrocracking, catalytic dewaxing and hydrotreating steps. In each of these multistep processes, the catalytic dewaxing step employs a catalyst containing a crystalline aluminosilicate zeolite, and optionally, exchanged or impregnated hydrogenating metals.

It can be appreciated that multistep processes for preparation of lube oils such as those described hereinabove would be improved if they could be simplified to reduce the number of operations required to attain lube oil base stocks having a desirable combination of properties while retaining applicability with respect to a wide range of feeds. It is an object of this invention to provide an improved process for preparation of lube oils. A further object is to provide a single step process for preparation of lube oil base stocks. Another object of the invention is to provide an improved catalytic process for production of lube oils of low pour point and high viscosity index from a wide range of feeds including even those typically regarded as economically unsuitable for use in multistep processes. A still further object of the invention is to provide an improved process for catalytic dewaxing-hydrotreating of petroleum and synthetic crude oils and fractions thereof. Other objects of the invention will be apparent to persons skilled in the art from the following description and the appended claims.

We have now found that the objects of this invention can be attained by catalytic dewaxing-hydrotreating of hydrocarbon feeds in the presence of an improved catalyst comprising a shape selective zeolitic cracking component and a hydrogenating component of improved thermal stability comprising a chromium component, at least one other Group VIB metal component and at least one Group VIII metal component. Advantageously, catalytic dewaxing-hydrotreating in the presence of such catalytic compositions can be conducted under conditions somewhat more severe than those in conventional catalytic dewaxing processes such that substantial denitrogenation, desulfurization and hydrogenation, as well as selective cracking of waxy feed components takes place. Accordingly, not only are waxy feed components cracked according to the present invention, but also, feed impurities such as sulfur, oxygen and nitrogen are removed. Such results are surprising in view of prior art efforts to reduce levels of contaminants, and particularly nitrogen, by solvent extraction prior to catalytic dewaxing. In fact, according to one aspect of the invention, lube oil stocks of desirably low pour point, high viscosity index and good stability are produced from hydrocarbon feeds which may contain appreciable levels of aromatic feed components and contaminants such as sulfur, nitrogen or oxygen, by a single step process involving catalytic dewaxing-hydrotreating in the presence of the aforesaid catalyst. Suitable feeds according to this aspect of the invention include not only higher quality hydrocarbons of the type commonly employed in processes for preparation of lube oils, but also, low quality hydrocarbons typically regarded unsuitable even for multi-step processes. In addition to the highly desirable results attained in preparation of lube oil stocks according to the present invention, the invented catalytic dewaxing-hydrotreating process yields desirable results in treatment of high sulfur, waxy crude oils such as Great Salt Lake crude oil which is so waxy that it cannot be pumped until wax content has been reduced.

In connection with the present invention, it is to be noted that hydrogen processing catalysts containing a hydrogenating component comprising a chromium component, a molybdenum component and at least one Group VIII metal component are known as are various processes for using the same. For example, U.S. Pat. No. 4,224,144 (Hensley et al.) discloses and claims hydrotreating of petroleum distillates and similar feeds using the aforesaid catalysts to attain improved results in terms of denitrogenation and desulfurization. Further, in our co-pending, commonly assigned application Ser. No. 200,536 filed Oct. 24, 1980, we have disclosed and claimed catalytic compositions containing the aforesaid hydrogenating component, a porous refractory inorganic oxide component and a crystalline molecular sieve zeolite component. Such catalysts are particularly useful in hydrodenitrogenation and hydrocracking of high nitrogen feeds. Suitable zeolites according to such earlier application include shape selective crystalline molecular sieve zeolites among others.

DESCRIPTION OF THE INVENTION

Briefly, the catalytic dewaxing-hydrotreating process of the present invention comprises contacting a hydrocarbon feed with hydrogen under catalytic dewaxing-hydrotreating conditions in the presence of a catalyst comprising a shape selective zeolitic cracking component and a hydrogenating component of improved thermal stability comprising a chromium component, at least one other Group VIB metal component and at least one Group VIII metal component. According to a more specific aspect of the invention there is provided an improved process for preparation of lube oils of low pour point and high viscosity index consisting essentially of catalytically dewaxing-hydrotreating a petroleum or synthetic crude oil fraction which may contain appreciable quantities of aromatics and impurities such as sulfur or nitrogen, in the presence of the aforesaid catalyst.

In greater detail, the hydrocarbon feed materials employed according to the present invention are whole petroleum or synthetic crude oils, coal or biomass liquids, or fractions thereof. The catalytic dewaxing-hydrotreating process of the present invention gives particularly good results with respect to feeds containing sufficiently high levels of waxy components as to exhibit pour points of at least about 30° F. Preferred feed materials for preparation of lube oil base stocks by the single step process of this invention are distillate fractions boiling above about 500° F. and having pour points of about 50° to about 130° F. Both vacuum and atmospheric distillate fractions are contemplated according to the invention as are deasphalted resids or other fractions that have been hydrotreated or hydrocracked to reduce boiling point and/or remove impurities such as sulfur, nitrogen, oxygen or metals. While such feeds are contemplated, it should be understood that the feed materials employed according to the present invention can contain appreciable levels of impurities such as sulfur, nitrogen and/or oxygen. For example, up to about 12 wt. % sulfur, 1.5 wt. % oxygen and/or about 1.5 wt. % nitrogen can be present in the feed without adversely affecting the dewaxing process. While not preferred, the present invention also contemplates the use of solvent extracted or dewaxed raffinates as feed materials.

Catalytic dewaxing-hydrotreating conditions employed according to the present invention vary somewhat depending upon the choice of feed material. In general, however, the temperature ranges from about 650° to about 820° F., hydrogen pressure ranges from about 800 to about 2500 psi, linear hourly space velocity (LHSV) ranges from about 0.2 to about 2 volumes of feed per volume of catalyst per hour (reciprocal hours) and hydrogen addition rate ranges from about 1000 to about 20,000 standard cubic feet per barrel (SCFB). Owing to the high temperature stability of the catalyst employed according to the invented process, conditions employed according to the invention can be somewhat more severe than those employed in typical catalytic dewaxing processes and such conditions are preferred according to that aspect of the present invention in which high quality lube oil base stocks are produced by a process consisting essentially of catalytic dewaxing-hydrotreating according to the invention. Such conditions include a temperature of about 700° to about 800° F., hydrogen pressure of about 1000 to about 2000 psi, LHSV of about 0.3 to about 2 reciprocal hours and hydrogen addition rate of about 2000 to about 12,000 SCFB.

Contacting of the hydrocarbon feed with hydrogen under the aforesaid conditions can be conducted using either a fixed or expanded bed of catalyst and in a single reactor or a series of reactors as desired.

The catalyst employed according to the present invention comprises a shape selective zeolitic cracking component and a hydrogenating component of improved thermal stability comprising a chromium component, at least one other Group VIB metal component and at least one Group VIII metal component. For purposes hereof, a shape selective zeolitic cracking component is defined as a crystalline molecular sieve zeolite component having substantial cracking activity with respect to n-paraffins and isoparrafins, but only insubstantial cracking activity with respect to branched paraffins having long side chains and cyclic components such as naphthenes and aromatics. Such shape selective zeolitic cracking components often are synthesized in alkali metal form, i.e., with alkali metal cations associated with framework metal ions. However, for purposes hereof, the zeolitic component must be in acid, ammonium or polyvalent metal ion-exchanged form in order to provide suitable cracking activity. The acid form is preferred.

One class of crystalline molecular sieve zeolites useful as the shape selective zeolitic cracking component of the catalysts employed according to the present invention is the shape selective crystalline borosilicate zeolites of the AMS type. Such materials have the following composition in terms of mole ratios of oxides, 0.9±0.2 $M_{2/n}O:B_2O_3:YSiO_2:ZH_2O$ wherein M is at least one cation having a valence of n, Y ranges from about 4 to about 600 and Z ranges from 0 to about 160, and provide an X-ray diffraction pattern comprising the following X-ray diffraction lines and assigned strengths.

| d (Å) | Assigned Strength |
|---|---|
| 11.2 ± 0.2 | W–VS |
| 10.0 ± 0.2 | W–MS |
| 5.97 ± 0.07 | W–M |
| 3.82 ± 0.05 | VS |
| 3.70 ± 0.05 | MS |
| 3.62 ± 0.05 | M–MS |
| 2.97 ± 0.02 | W–M |
| 1.99 ± 0.02 | VW–M |

Such crystalline borosilicates typically are prepared by reaction of boron oxide and a silicon-containing material in a basic medium. Further details with respect to these shape selective crystalline borosilicate zeolitic cracking components are found in commonly assigned U.S. Pat. No. 4,269,813 (Klotz) which is incorporated herein by reference.

A second useful class of shape selective zeolitic cracking components useful according to the present invention are the shape selective crystalline aluminosilicate zeolites of the ZSM type. Suitable crystalline aluminosilicate zeolites of this type typically have silica to alumina mole ratios of at least about 12:1 and pore diameters of at least 5Å. A specific example of a useful crystalline aluminosilicate zeolite of the ZSM type is crystalline aluminosilicate zeolite ZSM-5, which is described in detail in U.S. Pat. No. 3,702,886. Other shape selective cracking components contemplated according to the invention include crystalline aluminosilicate zeolite ZSM-11, which is described in detail in U.S. Pat. No. 3,709,979; crystalline aluminosilicate zeolite ZSM-12, which is described in detail in U.S. Pat. No. 3,832,449; crystalline aluminosilicate zeolite ZSM-35, which is described in detail in U.S. Pat. No. 4,016,245; and crystalline aluminosilicate zeolite ZSM-38, which is described in detail in U.S. Pat. No. 4,046,859. All of the aforesaid patents are incorporated herein by reference. A preferred crystalline aluminosilicate zeolite of the ZSM type is crystalline aluminosilicate zeolite ZSM-5 owing to its desirable selectivity and cracking activity.

A third class of shape selective zeolitic cracking component useful in the catalysts employed in the process of the present invention is the mordenite-type crystalline aluminosilicate zeolites. Specific examples of these are described in detail in U.S. Pat. No. 3,247,098 (Kimberline), U.S. Pat. No. 3,281,483 (Benesi et al.) and U.S. Pat. No. 3,299,153 (Adams et al.), all of which are incorporated herein by reference. Synthetic mordenite-type zeolites such as those designated Zeolon and available from Norton Company also are suitable according to the invented process.

Among the above-described shape selective zeolitic cracking components, the crystalline borosilicate zeolites of the AMS type, and particularly those in acid form such as crystalline borosilicate zeolite HAMS-1B are preferred owing to their superior stability and selectivity. Mordenite-type zeolites are least preferred in view of their poor selectivity.

Although not required, it is preferred to employ the above-described shape selective zeolitic cracking component dispersed in a matrix of at least one non-zeolitic, porous refractory inorganic oxide matrix component as the use of such a matrix component facilitates provision of the ultimate catalyst in a shape or form well suited for process use. Useful matrix components include alumina, silica, silicaalumina, zirconia, titania, etc., and various combinations thereof. The matrix component also can contain various adjuvants such as phosphorus oxides, boron oxides and/or halogens such as fluorine or chlorine. Usefully, the zeolite-matrix dispersion contains about 5 to about 50 wt.% zeolite component and about 50 to about 95 wt.% matrix component.

Methods for dispersing zeolitic materials within a matrix component are well known to persons skilled in the art and applicable with respect to the shape selective zeolitic materials employed according to the present invention. A preferred method is to blend the shape selective zeolitic component, preferably in finely divided form, in a sol, hydrosol or hydrogel of an inorganic oxide, and then add a gelling medium such as ammonium hydroxide to the blend with stirring to produce a gel. The resulting gel can be dried, shaped if desired, and calcined. Drying preferably is conducted in air at a temperature of about 80° to about 350° F. (about 27° to about 177° C.) for a period of several seconds to several hours. Calcination preferably is conducted by heating in air at about 800° to about 1,200° F. (about 427° to about 649° C.) for a period of time ranging from about ½ to about 16 hours.

Another suitable method for preparing a dispersion of shape selective zeolite component in a porous refractory oxide matrix component is to dryblend particles of each, preferably in finely divided form, and then shape the dispersion if desired.

The hydrogenating component of the catalyst employed according to the present invention exhibits improved stability and lifetime under process conditions and comprises a chromium component, at least one other Group VIB metal component and at least one Group VIII metal component. The metal components can be present in elemental form, as oxides or sulfides, or as combinations thereof. For purposes hereof, the recitation "at least one other Group VIB metal component" is defined as a molybdenum component, a tungsten component or a combination thereof. Useful Group VIII metals include iron, cobalt, nickel, ruthenium, rhodium, palladium, osmium, iridium and platinum. Among these, cobalt and nickel are preferred owing to their higher hydrogenating activities in the presence of sulfur.

Relative proportions of the shape selective zeolitic cracking component and hydrogenating components of the catalysts are such that at least a catalytically effective amount of each is present. Preferably, catalysts employed according to the invention contain about 10 to about 70 wt.% of the zeolitic component and about 3 to about 35 wt.% of the hydrogenating component. More preferably, zeolitic component concentration ranges from about 20 to about 40 wt.% in order to attain a desirable degree of selective cracking activity while avoiding inclusion in the catalyst of amounts of zeolite component that unduly increase the cost of the ultimate catalyst. When the zeolite component is employed as a dispersion in a matrix component, preferred matrix component content ranges from about 30 to about 90 wt.% based on total catalyst weight. With respect to the hydrogenating component, chromium component content is at least sufficient to provide the catalyst with a high degree of thermal stability. Calculated as $Cr_2O_3$, chromium content preferably ranges from about 1 to about 20 wt.% based on total catalyst weight. Chromium contents of about 3 to about 12 wt.% are more preferred from the standpoint of attaining the desired degree of stability without including so much chromium as to adversely affect hydrogenation activity. Content of the other Group VIB metal component, calculated as hexavalent metal oxide, preferably ranges from about 1 to about 20 wt.% with about 7 to about 18 wt.% being more preferred from the standpoint of hydrogenating activity. Group VIII metal content, calculated as divalent metal oxide in the case of cobalt, nickel and/or iron, preferably ranges from about 0.1 to about 10 wt.% with about 0.5 to about 5 wt.% being more preferred in terms of hydrogenation activity. Higher levels of metals can be employed if desired through the degree of improvement resulting therefrom typically is insufficient to justify the added cost of the metals.

Preferably, the hydrogenating component of the catalyst employed according to this invention is associated with the shape selective zeolitic cracking component by impregnation of the zeolitic component, or zeolitic component dispersed in a porous refractory inorganic oxide matrix, with one or more solutions of compounds of the metals of the hydrogenating component which compounds are convertible to oxides on calcination. It also is contemplated, however, to impregnate a porous refractory inorganic oxide matrix component with such solutions of the metal components and then blend the zeolitic component with the resulting impregnation product. Accordingly, the present invention contemplates the use of catalysts in which hydrogenating component is deposed on the zeolitic component or on a zeolite-matrix component dispersion or on the matrix component of a zeolite-matrix dispersion.

The mechanics of impregnating the zeolitic component, matrix component or zeolite-matrix composite with solutions of compounds convertible to metal oxides on calcination are well known to persons skilled in the art and generally involve forming solutions of appropriate compounds in suitable solvents, preferably water, and then contacting the zeolite, matrix component or zeolite-matrix dispersion with an amount or amounts of solution or solutions sufficient to deposit appropriate amounts of metal or metal salts onto the zeolite or zeolite-matrix dispersion. Useful metal compounds convertible to oxides are well known to persons skilled in the art and include various ammonium salts, as well as metal acetates, nitrates, anhydrides, etc. Specific examples of useful metal compounds include ammonium chromate, ammonium dichromate, chromium(III) nitrate, chromium acetate, ammonium molybdate, ammonium paramolybdate, molybdic anhydride, ammonium tungstate, cobalt nitrate, cobalt acetate, nickel nitrate, nickel acetate, ferric nitrate and ferric acetate.

The above described catalysts can be employed in any suitable form such as spheres, extrudate, pellets, C-shaped or cloverleaf-shaped particles.

The catalytic dewaxing-hydrotreating process described hereinabove can be included as part of a multistep process for preparation of lube oils wherein catalytic dewaxing is conducted in combination with other conventional processing steps such as solvent extraction, deasphalting, solvent dewaxing, hydrocracking and/or hydrotreating, to obtain lube oil base stocks of relatively low pour point and high viscosity index and stability.

According to a preferred aspect of the invention, however, there is provided an improved process for preparation of high quality lube oil base stocks of high viscosity index, low pour point and good stability consisting essentially of catalytically dewaxing-hydrotreating a petroleum or synthetic crude oil fraction containing up to about 12 wt.% sulfur, 1.5 wt.% oxygen and/or 1.5 wt.% nitrogen in the presence of the aforesaid catalyst. Conditions according to this aspect of the invention typically are somewhat more severe than those in catalytic dewaxing operations conducted as part of a multistep process. As noted hereinabove, preferred conditions according to this aspect of the invention include temperatures ranging from about 700° to about 800° F., pressures of about 1000 to about 2000 psi, LHSV of about 0.3 to about 2 reciprocal hours and hydrogen addition rates of about 2000 to about 12,000 SCFB. A preferred catalyst according to this aspect of the invention is one in which the shape selective zeolitic cracking component is a crystalline borosilicate component of the AMS-1B type in hydrogen form, and the hydrogenating component comprises a chromium component, a molybdenum component, and a nickel or cobalt component. More preferably, the shape selective crystalline borosilicate cracking component is employed in the form of a disperson within an alumina matrix.

Products obtained according to this aspect of the invention exhibit low pour points, high viscosity index and good stability. Preferably, pour point ranges from about −30 to about +20 and viscosity index ranges from about 70 to about 95.

The present invention is described in further detail in connection with the following examples, it being understood that the same are for purposes of illustration and not limitation.

EXAMPLE 1

A support component containing 25 wt.% shape selective crystalline borosilicate zeolite HAMS-1B dispersed within a matrix of 75 wt.% PHF alumina was prepared by suspending 90 g of the crystalline borosilicate zeolite material in about 150 ml water at ambient temperature after which the suspension was added to 3600 g of an alumina sol. 400 ml of 1:1 solution of ammonium hydroxide in distilled water then were added and the result was stirred to form a gel. The gel then was transferred to a pan which was placed in a 250° F. oven to dry. This procedure was repeated and the two batches of dried gel were combined and then ground to particles of 100 mesh size. The ground product then was mixed with water and extruded using a Bonnot extruder, dried at 250° F. for 16 hours, and then calcined in air at 1000° F. overnight.

Catalyst containing the above-described support was prepared as follows. 66.4 g $(NH_4)_2Cr_2O_7$ were dissolved in 270 ml distilled water and then added to 294 g of the alumina-HAMS-1B support. The result was mixed slowly for a short time after which excess liquid was decanted and the remaining impregnation product was calcined in air at 1000° F. overnight. Subsequently, the previously decanted liquid was slowly mixed with the calcined product for a short time and the result was again calcined in air at 1000° F. for several hours. 73.6 g $(NH_4)_6Mo_7O_{24}.4H_2O$ then were dissolved in 200 ml distilled water and the result was added to the calcined product and mixed for a short time. Excess liquid was decanted and the result was calcined in air at 1000° F. for about 65 hours. 27.25 g $Ni(NO_3)_2.6H_2O$ were dissolved in 100 ml distilled water and the result was added to a portion of the calcined product and the result was stirred for a short time. The result was calcined at 1000° F. in air for several hours, allowed to cool, and ground to 14-20 mesh size.

Elemental analysis of the finished catalyst revealed 10 wt.% $Cr_2O_3$, 15 wt.% $MoO_3$ and 3.5 wt.% NiO on the basis of total catalyst weight.

EXAMPLE 2

A second catalyst was prepared substantially according to the procedure of Example 1 except that the alumina content of the zeolite-alumina matrix dispersion was increased to 80 wt.%, zeolite content was correspondingly reduced to 20 wt.% and a crystalline aluminosilicate zeolite ZSM-5 was employed as the shape selective zeolitic cracking component. Chromium, molybdenum and nickel contents of this catalyst were similar to those in Example 1.

COMPARATIVE EXAMPLE

For comparison, a catalyst lacking a shape selective zeolitic cracking component was prepared according to the general procedure of Example 1 to contain 10 wt.% $Cr_2O_3$, 10 wt.% $MoO_3$ and 1.5 wt.% NiO on a zeolite-aluminum dispersion containing 30 wt.% ultrastable Y-type molecular sieve (obtained from Davison Chemical Division of W. R. Grace and Co.) and 70 wt.% alumina.

EXAMPLE 3

The catalysts prepared according to the foregoing examples were tested for catalytic dewaxing-hydrotreating activity in an automated processing unit having a downflow tubular reactor having a length of about 32" and inner diameter of ⅜" associated with automatic controls to maintain constant flow of gas and feed, pressure and temperature. Catalyst was ground to 14-20 mesh, loaded into the reactor and contacted with 8 vol.% $H_2S$ in hydrogen at 300° F. for 1 hour, at 400° F. for 1 hour and at 700° F. for 1 hour. Flow of the gaseous mixture was discontinued and the reactor was pressured with hydrogen, heated to operating temperature and feed was introduced into the reactor using a positive displacement pump. Products were removed using a high pressure separator.

All runs were carried out using a high sulfur, waxy, heavy vacuum gas oil having the following properties:

| API Gravity (°) | 18.7 |
|---|---|
| Pour Point (°F.) | 110 |
| Viscosity (cst at 100° C.) | 11.68 |
| Carbon (wt. %) | 85.18 |
| Hydrogen (wt. %) | 11.66 |
| Sulfur (wt. %) | 2.98 |
| Nitrogen (wt. %) | 0.170 |
| Simulated Distillation (°F.) | |
| IBP | 409 |
| 5% | 671 |
| 20% | 788 |
| 40% | 863 |
| 60% | 918 |
| 80% | 977 |
| 95% | — |
| Paraffins (wt. %) | 17.7 |
| Cycloparaffins (wt. %) | 34.2 |
| Monoaromatics (wt. %) | 13.1 |
| Diaromatics (wt. %) | 9.1 |
| Triaromatics | 5.7 |
| Other Polycyclic Aromatics (wt. %) | 20.1 |

Specific operating conditions and results are reported in Table I.

TABLE I

| Run No. | 1 | 2 | 3 |
|---|---|---|---|
| Catalyst | 1 | 2 | Comparative |
| LHSV (hour$^{-1}$) | 1.25 | 1.25 | 1.25 |
| Temperature (°F.) | 780 | 780 | 780 |
| Pressure (psi) | 1200 | 1200 | 1200 |
| Hydrogen Rate (SCFB) | 16000 | 12000 | 13000 |
| Hours on Oil | 251 | 310 | 300 |
| API Gravity (°) | 29.8 | 29.8 | 29.8 |
| Pour Point (°F.) | −5 | −10 | 105 |
| Viscosity (cst at 100° C.) | 2.91 | 2.80 | 3.11 |
| Carbon (wt %) | 87.36 | 87.37 | 87.12 |
| Hydrogen (wt %) | 12.61 | 12.61 | 12.85 |
| Sulfur (ppm) | 79 | 80 | 150 |
| Nitrogen (ppm) | 210 | 265 | 160 |
| Sim. Distillation (°F.) | | | |
| IBP | 116 | 110 | 158 |
| 5% | 275 | 270 | 307 |
| 20% | 522 | 534 | 533 |
| 40% | 672 | 690 | 724 |
| 60% | 765 | 741 | 803 |
| 80% | 852 | 875 | 884 |
| 95% | 942 | 961 | 969 |
| % Desulfurization | 99.7 | 99.7 | 99.1 |
| % Denitrogenation | 87.6 | 84.4 | 90.5 |
| Hydrogen Consumed (SCFB) | 610 | 630 | 755 |
| Volume Yield (%) | 102.1 | 101.6 | 103.8 |
| 650° F.+ Yield (wt %) | 64.0 | 66.7 | 66.8 |

As can be seen from the table, catalytic dewaxing-hydrotreating according to the invention in the presence of catalysts 1 and 2 containing shape selective zeolitic cracking components resulted in a substantial removal of waxy feed components as evidenced by the reductions in pour point as compared to that of the feed. Catalyst 1 was superior to Catalyst 2 in terms of denitrogenation and accordingly, in terms of product stability. Catalytic dewaxing-hydrotreating using the comparative catalyst yielded a product having a pour point essentially unchanged from that of the feed thus indicating that only insubstantial cracking of waxy feed components took place.

EXAMPLE 4

The product from Run No. 1 of Example 3 was distilled into three fractions, one of which boiled up to 360° F., another from 360°–650° F. and a third above 650° F. Inspections for the three fractions are reported in Table II.

TABLE II

| Fraction: | to 360° F. | 360°–650° F. | 650° F.+ |
|---|---|---|---|
| Wt % of Total Product | 8.3 | 28.4 | 64.3 |
| API Gravity (°) | 57.4 | 30.9 | 26.4 |
| Viscosity (cst at 40° C.) | ND* | ND | 47.5 |
| Viscosity (cst at 100° C.) | ND | ND | 6.4 |
| Viscosity Index | ND | ND | 70 |
| Pour Point (°F.) | ND | ND | 20 |
| Sulfur (ppm) | ND | ND | 73 |
| Nitrogen (ppm) | ND | ND | 273 |
| Avg. Mol. Wt. | ND | ND | 333 |
| Sim. Dist. (°F.) | | | |
| IBP | ND | ND | 58 |
| 5% | ND | ND | 666 |
| 20% | ND | ND | 721 |
| 40% | ND | ND | 780 |
| 60% | ND | ND | 837 |
| 80% | ND | ND | 904 |
| 95% | ND | ND | 980 |
| Paraffins (wt %) | ND | ND | 16.7 |
| Cycloparaffins (wt %) | ND | ND | 44.8 |
| Monoaromatics (wt %) | ND | ND | 21.7 |
| Diaromatics (wt %) | ND | ND | 7.9 |
| Triaromatics (wt %) | ND | ND | 3.7 |
| Other Polycyclic | ND | ND | 5.2 |
| Aromatics (wt %) | | | |

*ND stands for not determined.

As can be seen that this example and Table II, the 650° F.+ fraction of the product was well suited for lube oil applications in view of its low pour point, high viscosity index, high content of monoaromatics and cycloparaffins and low content of polycyclic aromatics.

EXAMPLE 5

The catalyst from Example 1 was employed in a series of additional runs in which temperature space velocity and hydrogen rate were varied. Conditions and results are reported in Table III.

TABLE III

| Run No. | 1 | 2 | 3 |
|---|---|---|---|
| LHSV (hour$^{-1}$) | .54 | .54 | 1.08 |
| Temperature (°F.) | 740 | 780 | 780 |
| Pressure (psi) | 1800 | 1800 | 1800 |
| Hydrogen Rate (SCFB) | 14000 | 18000 | 7400 |
| Hours on Oil | 284 | 356 | 452 |
| API Gravity (°) | 31.8 | 34.2 | 31.3 |
| Pour Point (°F.) | −60 | −60 | −60 |
| Viscosity (cst at 100° C.) | 2.84 | * | 2.75 |
| Carbon (wt %) | 86.64 | 86.93 | 86.86 |
| Hydrogen (wt %) | 13.35 | 13.07 | 13.12 |
| Sulfur (ppm) | 20 | 17 | 208 |
| Nitrogen (ppm) | 101 | 1.4 | 58 |
| Sim. Distillation (°F.) | | | |
| IBP | 175 | 144 | 132 |
| 5% | 310 | 271 | 272 |
| 20% | 519 | 438 | 494 |
| 40% | 665 | 567 | 650 |
| 60% | 768 | 671 | 757 |
| 80% | 862 | 789 | 853 |
| 95% | 954 | ND | 947 |
| % Desulfurization | 99.9 | 99.9 | 99.3 |
| % Denitrogenation | 94.0 | 99.9 | 96.6 |
| Hydrogen consumed (SCFB) | 1240 | 1440 | 1030 |
| Volume Yield (%) | 97.7 | ND | 101.9 |
| 650° F.+ Yield (wt %) | 58.8 | 36.9 | 57.5 |

*4.63 at 40° C.

As can be seen from this example and the table, catalytic dewaxing in the presence of catalyst 1 yielded a product having a desirable combination of properties from the standpoint of utility as a lube oil base stock with variations in temperature, hydrogen rate and space velocity.

EXAMPLE 6

The product from Run No. 3 of Example 5 (Table III) was distilled into three fractions, one boiling up to 360° F., a second boiling from 360°–650° F. and a third boiling above 650° F. Properties of the fractions were determined and are reported in Table IV.

TABLE IV

| Fraction: | to 360° F. | 360°–650° F. | 650° F.+ |
|---|---|---|---|
| Wt. % of Total Product | 10.7 | 29.7 | 59.5 |
| API Gravity (°) | 56.6 | 30.3 | 27.7 |
| Viscosity (cst at 40° C.) | ND* | ND | 49.2 |
| Viscosity (cst at 100° C.) | ND | ND | 6.36 |
| Viscosity Index | ND | ND | 70 |
| Pour Point (°F.) | ND | ND | 5 |
| Avg. Mol. Wt. | ND | ND | 351 |
| Paraffins (wt %) | ND | ND | 17.2 |
| Cycloparaffins (wt %) | ND | ND | 49.4 |
| Monoaromatics (wt %) | ND | ND | 16.4 |
| Diaromatics (wt %) | ND | ND | 7.3 |
| Triaromatics (wt %) | ND | ND | 3.1 |

TABLE IV-continued

| Fraction: | to 360° F. | 360°–650° F. | 650° F.+ |
|---|---|---|---|
| Other Polycyclic Aromatics (wt %) | ND | ND | 6.6 |

*ND stands for not determined.

EXAMPLE 7

The product from Run No. 1 of Example 5 (Table III) was distilled into three fractions, one boiling up to 360° F., one boiling from 360°–650° F. and a third boiling above 650° F. Properties are reported in Table V.

TABLE V

| Fraction: | to 360° F. | 360°–650° F. | 650° F.+ |
|---|---|---|---|
| Wt. % of Total Product | 6.6 | 30.6 | 62.5 |
| API Gravity (°) | *ND | 32.9 | 29.2 |
| Viscosity (cst at 40° C.) | ND | ND | 47.2 |
| Viscosity (cst at 100° C.) | ND | ND | 6.61 |
| Viscosity Index | ND | ND | 90 |
| Pour Point (°F.) | ND | ND | −40 |
| Avg. Mol. Wt. | ND | ND | 358 |
| Paraffins (wt %) | ND | ND | 15.1 |
| Cycloparaffins (wt %) | ND | ND | 64.6 |
| Monoaromatics (wt %) | ND | ND | 8.5 |
| Diaromatics (wt %) | ND | ND | 4.5 |
| Triaromatics (wt %) | ND | ND | 2.2 |
| Other Polycyclic Aromatics (wt %) | ND | ND | 5.0 |

*ND stands for not determined.

As can be seen from this example and the table, the 650° F.+ fraction of the product from Example 5 Run No. 1 was obtained in high yield (62.5 wt.%), with a high viscosity index, low pour point, high cycloparaffin content and low polycyclic aromatics content. Accordingly, this example and the table illustrate a preferred catalytic dewaxing-hydrotreating process according to the invention in which a feed poorly suited for even conventional multistep lube oil production processes in view of its high polycyclic aromatics and substantial paraffins, sulfur and nitrogen contents, was converted to product having desirable lube oil properties in good yield.

EXAMPLE 8

In this example, a catalyst (8) prepared according to the general procedure of Example 1 to contain 8.9 wt.% $Cr_2O_3$, 15.0 wt.% $MoO_3$ and 3.5 wt.% NiO impregnated on a dispersion of shape selective zeolitic cracking component and alumina containing 20 wt.% crystalline borosilicate zeolite HAMS-1B and 80 wt.% PHF alumina was used to dewax a high sulfur, waxy, Great Salt Lake whole crude oil having properties shown below.

| | |
|---|---|
| API Gravity (°) | 5.9 |
| Specific Gravity (g/cc) | 1.0295 |
| Sulfur (wt. %) | 11.2 |
| Nitrogen (wt. %) | 0.5 |
| Carbon (wt. %) | 77.14 |
| Hydrogen (wt. %) | 10.19 |
| Oxygen (wt. %) | 1.04 |
| Nickel (ppm) | 12 |
| Vanadium (ppm) | 5 |
| Oils (wt. %) | 27.7 |
| Resins (wt. %) | 68.6 |
| Asphaltenes (wt. %) | 3.5 |
| Simulated Distillation | |
| IBP-650° F. (wt. %) | 4.6 |
| 650–1000° F. (wt. %) | 33.7 |
| 1000° F.+ (wt. %) | 61.7 |

The feed was contacted with hydrogen in the presence of catalyst 8 in a reactor similar to that employed in Example 3. Comparative runs were conducted using a catalyst containing 3.5 wt.% CoO and 12 wt.% $MoO_3$ supported on alumina. Operating conditions and results for the runs are reported in Table VI.

TABLE VI

| Run No. | 1 | 2 | 3 | 4 |
|---|---|---|---|---|
| Catalyst | 8 | 8 | CoMo/Al$_2$O$_3$ | CoMo/Al$_2$O$_3$ |
| LHSV (hr$^{-1}$) | 1.4 | 0.7 | 0.5 | 1.25 |
| Temp. (°F.) | 750 | 760 | 730 | 730 |
| Pressure (psi) | 1500 | 1500 | 1800 | 1200 |
| API Gravity (°) | 34 | 38 | 29.5 | 27.5 |
| Carbon (wt %) | ND* | ND | 86.35 | 86.12 |
| Hydrogen (wt %) | ND | ND | 13.53 | 13.22 |
| Nitrogen (wt %) | 0.12 | 0.01 | 0.09 | 0.285 |
| Sulfur (wt %) | 0.07 | 0.02 | 0.11 | 0.27 |
| Wt. % IBP-360° F. | ND | 19.5 | 2.3 | 4.7 |
| 360°–650° F. | ND | 43.1 | 20.4 | 21.8 |
| 650–1000° F. | ND | 37.4 | 51.4 | 43.1 |
| 1000° F.+ | ND | 0 | 25.9 | 30.4 |
| Pour Point (°F.) | 55 | −40 | 100 | 110 |

*ND stands for not determined.

From this example and the table it can be seen that the process of this invention can be employed to catalytically dewax and hydrotreat heavy crude oils of high sulfur and wax content to products having significantly reduced pour points as well as sulfur content. Accordingly, the process of this invention is well suited for on-site treatment of crude oils to improve their pumpability so that the same can be transported to refining locations.

We claim:

1. A process for catalytically dewaxing-hydrotreating hydrocarbon feeds comprising contacting the feed with hydrogen under catalytic dewaxing-hydrotreating conditions in the presence of a catalytic composition comprising (1) a hydrogenating component of improved thermal stability comprising a chromium component, at least one other Group VIB metal component and at least one Group VIII metal component deposited on at least a portion of (2) a support comprising a shape selective zeolitic cracking component.

2. The process of claim 1 wherein catalytic dewaxing-hydrotreating conditions include a temperature of about 650° to about 820° F., hydrogen pressure of about 800 to about 2500 psi, LHSV of about 0.2 to about 2 reciprocal hours and hydrogen addition rate of about 1000 to about 20,000 SCFB.

3. The process of claim 1 wherein the shape selective zeolitic cracking component is dispersed within a non-zeolitic porous refractory inorganic oxide matrix component.

4. The process of claim 3 wherein the hydrogenating component is deposed on the dispersion of zeolitic and matrix components.

5. The process of claim 3 wherein the hydrogenating component is deposed on the matrix component of the zeolite-matrix dispersion.

6. The process of claim 1 wherein the other Group VIB metal component comprises molybdenum and the Group VIII metal comprises cobalt or nickel.

7. The process according to any of claims 1–6 wherein the shape selective zeolitic cracking component comprises a crystalline borosilicate zeolite of the AMS type.

8. The process according to any of claims 1–6 wherein the shape selective zeolitic cracking component comprises a crystalline aluminosilicate zeolite of the ZSM type.

9. A process for catalytically dewaxing-hydrotreating hydrocarbon feeds having a pour point of at least about 30° F. comprising contacting the feed with hydrogen at about 700° to about 800° F., about 1000 to about 2000 psi hydrogen, about 0.3 to about 2 hour$^{-1}$ and about 2000 to about 12,000 SCFB hydrogen in the presence of catalyst comprising (1) a hydrogenating component comprising about 1 to about 20 wt.% $Cr_2O_3$, about 1 to about 20 wt.% $MoO_3$ and about 0.1 to about 10 wt.% CoO or NiO deposited on at least a portion of (2) a support comprising at least one shape selective zeolitic cracking component.

10. A process for producing lube oil base stocks of high viscosity index, low pour point and good stability consisting essentially of catalytically dewaxing-hydrotreating a hydrocarbon feed having a pour point of about 50° to about 130° F. and containing up to about 12 wt.% sulfur, 1.5 wt.% nitrogen at a temperature of about 700° to about 800° F., hydrogen pressure of about 1000 to about 2000 psi, LHSV of about 0.3 to about 2 reciprocal hours and hydrogen addition rate of about 2000 to about 12,000 SCFB in the presence of a catalyst comprising (1) a hydrogenating component of improved thermal stability comprising a chromium component, at least one other Group VIB metal component and at least one Group VIII metal component deposited on at least a portion of (2) a support comprising a shape selective zeolitic cracking component.

11. The process of claim 10 wherein the shape selective zeolitic cracking component is dispersed within a porous refractory inorganic oxide matrix component.

12. The process of claim 11 wherein the hydrogenating component is deposed on the dispersion of zeolitic and matrix components.

13. The process of claim 11 wherein the hydrogenating component is deposed on the matrix component of the zeolite-matrix dispersion.

14. The process of claim 11 wherein the matrix component comprises alumina.

15. The process of claim 10 wherein the other Group VIB metal component comprises molybdenum and the Group VIII metal component comprises cobalt or nickel.

16. The process of any of claims 10–15 wherein the shape selective zeolitic cracking component comprises a crystalline borosilicate zeolite of the AMS type.

17. The process of any of claims 10–15 wherein the shape selective zeolitic cracking component comprises crystalline borosilicate zeolite HAMS-1B.

18. A process for producing lube oil base stocks of high viscosity index, low pour point and good stability comprising contacting a petroleum or synthetic crude oil distillate boiling above about 500° F., having a pour point of about 50° to about 130° F. and containing up to about 12 wt.% sulfur, 1.5 wt.% oxygen and/or 1.5 wt.% nitrogen with hydrogen at about 700° to about 800° F., 1000 to about 2000 psi hydrogen, 0.3 to about 2 reciprocal hours and about 2000 to about 12,000 SCFB hydrogen in the presence of a catalyst comprising (1) a hydrogenating component comprising about 3 to about 12 wt.% $Cr_2O_3$, about 7 to about 18 wt.% $MoO_3$ and about 0.5 to about 5 wt.% CoO or NiO deposited on at least a portion of (2) a support comprising a shape selective, crystalline borosilicate zeolitic cracking component of the AMS-type.

* * * * *

UNITED STATES PATENT OFFICE
CERTIFICATE OF CORRECTION

Patent No. 4,434,047           Dated February 28, 1984

Inventor(s) Albert L. Hensley, Jr., Thomas D. Nevitt and A. Martin Tait

It is certified that error appears in the above-identified patent and that said Letters Patent are hereby corrected as shown below:

| Column | Line  |                        |                      |
|--------|-------|------------------------|----------------------|
| 13     | 1/2   | after "Aromatics (wt %)  | should be -- ND ND 6.6 |
| 13     | 26/27 | after "Aromatics (wt %)  | should be -- ND ND 5.0 |

Signed and Sealed this

Fourteenth Day of January 1986

[SEAL]

Attest:

DONALD J. QUIGG

Attesting Officer     Commissioner of Patents and Trademarks